(12) United States Patent
Prowatke et al.

(10) Patent No.: US 9,061,939 B2
(45) Date of Patent: Jun. 23, 2015

(54) RED-DYED GLASS AND METHOD FOR PRODUCING SAME

(71) Applicant: D. Swarovski KG, Wattens (AT)

(72) Inventors: Stefan Prowatke, Wattens (AT); Johannes Maier, Innsbruck (AT)

(73) Assignee: D. SWAROVSKI KG, Wattens (AT)

( * ) Notice: Subject to any disclaimer, the term of this patent is extended or adjusted under 35 U.S.C. 154(b) by 30 days.

(21) Appl. No.: 13/658,306

(22) Filed: Oct. 23, 2012

(65) Prior Publication Data

US 2013/0045855 A1 Feb. 21, 2013

Related U.S. Application Data

(63) Continuation of application No. PCT/AT2011/000207, filed on Apr. 27, 2011.

(30) Foreign Application Priority Data

Apr. 28, 2010 (AT) .................. A 696/2010

(51) Int. Cl.
| | |
|---|---|
| *C03C 4/02* | (2006.01) |
| *C03C 1/10* | (2006.01) |
| *C03C 3/095* | (2006.01) |
| *C03C 3/118* | (2006.01) |

(52) U.S. Cl.
CPC .................. *C03C 3/118* (2013.01); *C03C 3/095* (2013.01); *C03C 1/10* (2013.01); *C03C 4/02* (2013.01)

(58) Field of Classification Search
CPC .......... C03C 1/10; C03C 3/076; C03C 3/087; C03C 3/085; C03C 3/095; C03C 4/02; C03B 27/00
USPC ....................... 501/55, 69, 70, 64; 65/32.5, 66
See application file for complete search history.

(56) References Cited

U.S. PATENT DOCUMENTS

| 3,779,734 A | 12/1973 | Simonfi et al. |
|---|---|---|
| 4,134,747 A | 1/1979 | Pierson et al. |
| 6,773,816 B2 * | 8/2004 | Tsutsumi ................... 428/428 |
| 7,612,003 B2 | 11/2009 | Lefevre et al. |
| 2006/0033440 A1 | 2/2006 | Steinmann et al. |
| 2007/0021288 A1 | 1/2007 | Lefevre et al. |

FOREIGN PATENT DOCUMENTS

| DE | 571 017 | 6/1933 |
|---|---|---|
| DE | 19 17 154 | 2/1970 |
| DE | 42 31 794 | 3/1994 |
| DE | 10 2004 026257 | 11/2005 |
| JP | 10-316450 | 12/1998 |
| JP | 2004-143003 | 5/2004 |
| JP | 2005-128110 | 5/2005 |
| WO | 2004/041739 | 5/2004 |

OTHER PUBLICATIONS

Van Schoick, Ed, Ceramic Glossary, 1963, The American Ceramic Society, pp. 6 and 29.*
Volf, Chemical Approach to Glass, 1984, Elsevier Science Publishing Company, Inc., pp. 391-405.*
International Search Report issued Aug. 11, 2011 in International Patent Application No. PCT/AT2011/000207.
Austrian Search Report issued Oct. 7, 2010 in corresponding Austrian Patent Application No. 696/2010, with English translation.
Bring et al., "Colour development in copper ruby alkali silicate glasses. Part 2. The effect of tin (II) oxide and antimony (III) oxide", Glass Technology: European Journal of Glass Science and Technology Part A, vol. 48, No. 3, Jun. 2007, XP001510484, pp. 142-148, with abstract.
C.R. Bamford, "Colour Generation and Control in Glass" Glass Science and Technology, vol. 2, 1977, XP007919191, ISBN: 0-444-41614-5, p. 70-71, figure 3.1, with abstract.
Werner Vogel, Glass Chemistry, Second edition 1994, XP007919189, ISBN: 3-540-57572-3, pp. 246-250, with abstract.

* cited by examiner

*Primary Examiner* — Anthony J Green
*Assistant Examiner* — Elizabeth A Bolden
(74) *Attorney, Agent, or Firm* — Wenderoth, Lind & Ponack, L.L.P.

(57) ABSTRACT

The invention relates to red-dyed glass, comprising the components of a base glass, coloring additives, reductants, and stabilizers, wherein the coloring additives comprise copper oxides and neodymium oxides and wherein the reductants comprise tin oxides and wherein the stabilizers comprise antimony oxides, wherein the fraction of the copper oxides in the red-dyed glass is between 0.02 and 0.08 weight percent.

24 Claims, 1 Drawing Sheet

RED-DYED GLASS AND METHOD FOR PRODUCING SAME

Figure 1:
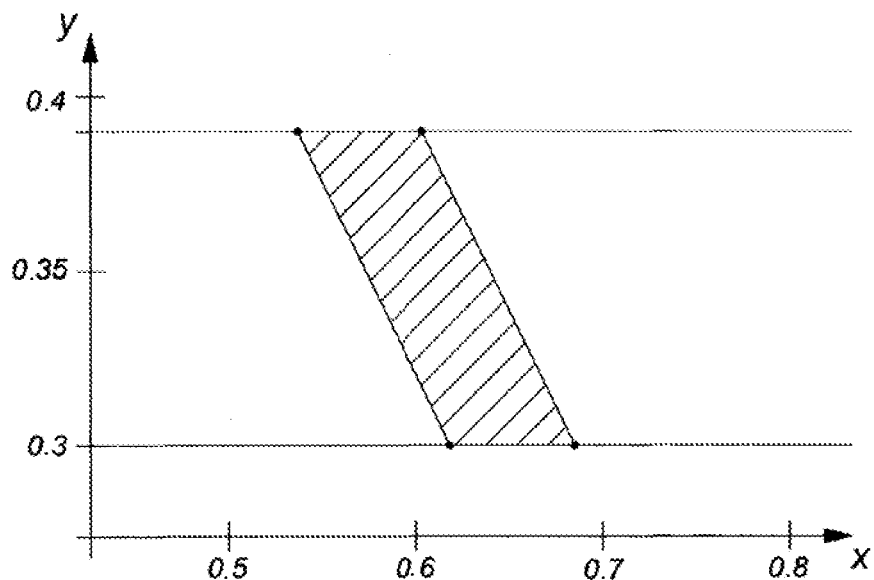

The invention concerns red-colored glass including the components of a basic glass, coloring additives, reducing agents, stabilising agents, wherein the coloring additives have copper oxides and neodymium oxides and wherein the reducing agents have tin oxides and wherein the stabilising agents have antimony oxides.

Several methods are known in the state of the art for coloring glasses which are transparent for light in the visible spectrum. Besides superficial coloring of the glass by the glass being provided with a colored coating it is usual for the production of glass which is colored therethrough for given coloring agents to be added to the molten glass material or the components thereof in order to impart the desired color to the glass by various method steps.

In the case of temperature colored glasses coloring oxides are added to the basic glass, wherein to produce the coloring action after the operation of melting the basic glass components which are mixed with the coloring oxides, a further heating step is necessary, in which the glass is tempered. In that case the nature of the color produced depends on the chemical basic components and the process parameters such as for example temperature and the temperature holding time of the tempering operation.

DE 42 31 794 A1 discloses red-colored temperature-treated glasses in which colored oxides are bound into a host lattice formed by the aluminum silicate glass, wherein the aim of that ion coloring is to absorb certain spectral ranges which are a hindrance in terms of providing the red color. Besides other coloring oxides like NiO and CoO it is also possible to use for that purpose CuO or neodymium oxide ($Nd_2O_3$). That absorption of a large part of the wavelengths of the visible spectrum means that the red-colored glass of DE 42 31 794 has a lesser degree of transmission so that the red of that colored glass gives a less brilliant impression.

Another possible option is to achieve coloring of glasses by metals in colloidal form being precipitated in the glass, the metals being finely distributed in the glass medium. The colloids produced by diffusion and aggregation during glass production of the dissolved metals do not need any host crystals for coloration. Such red-colored glasses are for example gold ruby glasses which however are also expensive to manufacture. In addition it is hitherto possible to produce glasses colored by metal colloids with the coloring substances cadmium (Cd) and selenium (Se) which admittedly have optically excellent properties such as high transmission and brilliance but which are undesirable due to their toxic action for environmental reasons.

U.S. Pat. No. 7,612,003 discloses a red-colored lamp glass, the red coloration being produced by metal colloids which originate from copper (I)-oxide. In that case the proportion of the copper oxides is at least 0.1% by weight so that the copper substances in the glass absorb a high proportion of red and the red-colored glass has a low level of transmission which, in respect of its optical qualities, cannot come up to the standard of red-colored glasses produced by red coloration with cadmium and/or selenium.

The object of the invention is to avoid the foregoing disadvantages and to provide a red-colored glass which has a high level of transmission with at the same time high brilliance in color shade and in that respect avoids the use of environmental poisons such as for example cadmium.

That is achieved by a red-colored glass comprising a basic glass, coloring additives, reducing agents, and stabilising agents, wherein the coloring additives have copper oxides and neodymium oxides, wherein the reducing agents have tin oxides, wherein the stabilising agents have antimony oxides, and wherein an amount of copper oxides in the red-colored glass is between 0.02 and 0.08% by weight.

By coloring additives having copper oxides and neodymium oxides being added to the components of a basic glass it is possible to dispense with the use of cadmium or selenium as a coloring agent. In that case the basic glass can be lead-free. Coloring is effected by firstly metal colloids being deposited out of the coloring additives during the glass manufacture, in which case metallic nanoparticles and in particular copper nanoparticles are formed, which come together to form colloids. For that purpose the copper oxide has to be reduced to metallic copper, for which reason the red-colored glass includes reducing agents which have tin oxides. Those reducing agents provide that the copper oxide is converted into metallic copper and as a further consequence into copper nanoparticles. To stabilise the copper nanoparticles in the glass the glass has stabilising agents with antimony oxides, in particular $Sb_2O_3$. The coloring additive neodymium, in particular $Nd_2O_3$, increases the absorption of the copper nanoparticles in ranges different from red whereby the red color becomes more brilliant and at the same time overall transmission can be increased or kept as high as possible.

According to the invention the proportion of the copper oxides in the red-colored glass is between 0.02 and 0.08% by weight of the overall components of the glass. That low value ensures high transmission of the red-colored glass, while in conjunction with the neodymium oxide used the brilliance of the red color is guaranteed in spite of the low proportion of copper oxide.

Further advantageous configurations of the invention are defined in the appendant claims.

The fact that the proportions of the coloring additives and the reducing agents and the stabilising agents in the red-colored glass are overall between 2 and 8% by weight further improves a high overall transmission with at the same time color brilliance in respect of the red color.

In a particularly preferred embodiment of the invention the coloring copper oxides which act as metal colloid forming agents are in the form of monovalent copper oxide, that is to say copper (I)-oxide ($Cu_2O$) or are introduced in that form into the glass. That copper oxide is reduced to metallic copper and as a result becomes effective for the red coloration effect. It is however generally also possible to use divalent copper, that is to say copper (II)-oxide (CuO).

In a preferred embodiment of the invention the tin oxides acting as reducing agents are in the form of SnO or are introduced in that form into the glass. In that case the copper oxides are reduced to metallic copper $Cu^0$ in accordance with the reduction formula $Cu^{2+}+Sn^{2+}=Cu^0+Sn^{4+}$, in which case they combine to form copper nanoparticles and as a further consequence colloids which ultimately produce the red color. In an embodiment of the invention the proportion of the neodymium oxides in the red-colored glass is between 0.5 and 5% by weight and additionally or alternatively the proportion of the antimony oxides in the red-colored glass is between 0.3 and 3.5% by weight and additionally or alternatively the proportion of the tin oxides in the red-colored glass is between 0.5 and 4% by weight.

In a further embodiment of the invention further additives are added to the glass, which make the red coloration more brilliant and in that case further stabilise the color or the coloring substances. In that respect it can be provided that those further additives include $AgCl_2$ in a proportion to the glass of at most 0.5% by weight and additionally or alternatively $Fe_2O_3$ in a proportion to the glass of at most 0.5% by weight and additionally or alternatively SnCl$_2$ in a proportion to the glass of at most 4% by weight and additionally or alternatively SnO$_2$ in a proportion to the glass of at most 4% by weight.

In a further embodiment of the invention the color point in accordance with DIN 5033 of the red-colored glass is arranged within a parallelogram having the corner points x=0.54, y=0.39 and x=0.61, y=0.39 and x=0.7, y=0.3 and x=0.62, y=0.3, in accordance with the standard color table in accordance with DIN 5033, wherein the x- and y-values relate to D65 standard light and a 2° observer.

In a particularly preferred embodiment of the invention the transmission of the red-colored glass with D65 standard light and a 2° observer is above a minimum value of 25%, with respect to the value integrated over the wavelength range of the visible light. It is however also conceivable for transmission to be at least 30 or at least 35%.

In an embodiment of the invention the basic glass includes the following components with the following proportions by mass:

| Oxide/ | % by weight | |
| --- | --- | --- |
| substance | From | To |
| SiO$_2$ | 50 | 75 |
| K$_2$O | 0 | 12 |
| Na$_2$O | 8 | 15 |
| Li$_2$O | 0 | 5 |
| ZnO | 0 | 13 |
| CaO | 0 | 11 |
| MgO | 0 | 7 |
| BaO | 0 | 10 |
| Al$_2$O$_3$ | 0 | 4 |
| ZrO$_2$ | 0 | 2 |
| B$_2$O$_3$ | 0 | 4 |
| F | 0 | 3 |
| Cl | 0 | 2.5 |

The invention further concerns a method of producing a red-colored glass which in particular is as described hereinbefore, wherein firstly the components of a basic glass are mixed with coloring additives including copper oxides and neodymium oxides and with reducing agents including zinc oxides and with stabilising agents including antimony oxides, wherein the proportion of the copper oxides is between 0.02 and 0.08% by weight.

The mixed substances are melted and then cooled down in per se known manner. That cooling operation can moreover include certain shaping processes such as for example drawing, blowing, pressing or centrifuging. The cooling process is not further essential for the provision of the red color.

In a further heating process, the so-called tempering operation, the reducing agents and the stabilising agents for the coloring additives have the mode of effect described hereinbefore.

The copper oxide is reduced to colloidal, red-coloring metallic copper which is deposited by means of the reducing agents from the oxides in metallic non-valent form. To achieve full color saturation the temperature is kept for a certain time above a minimum threshold during the tempering operation so that sufficiently large metal colloids which are responsible for the color can be formed. The precise process parameters of the tempering operation determine the color point of the red-colored glass.

In preferred embodiments of the method according to the invention, the above-specified values are provided for the proportion of the neodymium oxides and the zinc oxides and antimony oxides respectively. It is likewise provided in a preferred embodiment that the copper oxides are in the form of copper (I)-oxide and additionally or alternatively the zinc oxides are in the form of SnO or are introduced into the glass in that form, that is to say mixed with the components of the basic glass. It is however also conceivable to provide copper (II)-oxide (CuO) as copper oxides and/or SnO$_2$ as reducing agents. In an embodiment of the method of the invention the above-listed chemical substances with the associated values are also provided for the further additives provided for further improving the color brilliance and stability of the coloring substances or the color.

In an embodiment of the method according to the invention the basic glass used is a basic glass having the above-mentioned components.

In a further embodiment melting of the mixed substances is effected at a temperature between 1350° and 1500°, preferably under reducing conditions, to keep the elements Sn, Sb and Cu in the desired oxidation state.

In a further embodiment of the invention the tempering operation is effected at a temperature between 400 and 550°, preferably between 440° and 520° C. That temperature treatment which is also crucial for the specific coloring action or coloration is maintained for a duration of between 1 and 40 hours.

In a concrete embodiment of the invention the basic glass comprises the following components:

| Oxide/ substance | % by weight |
| --- | --- |
| SiO$_2$ | 60.8 |
| K$_2$O | 8.7 |
| Na$_2$O | 9.3 |
| ZnO | 9.3 |
| CaO | 0.4 |
| Al$_2$O$_3$ | 0.3 |
| B$_2$O$_3$ | 3.3 |
| F | 1.0 |
| Cl | 0.6 |

Copper (I)-oxide in a proportion of 0.05% by weight and Nd$_2$O$_3$ in a proportion of 2.3% by weight are provided as coloring additives. SnO and SnO$_2$ serve as reducing agents, which in total have a proportion of 1.8% by weight to the red-colored glass. Sb$_2$O$_3$ in a proportion of 2.2% by weight is used as the stabilising agent.

Figure 2:
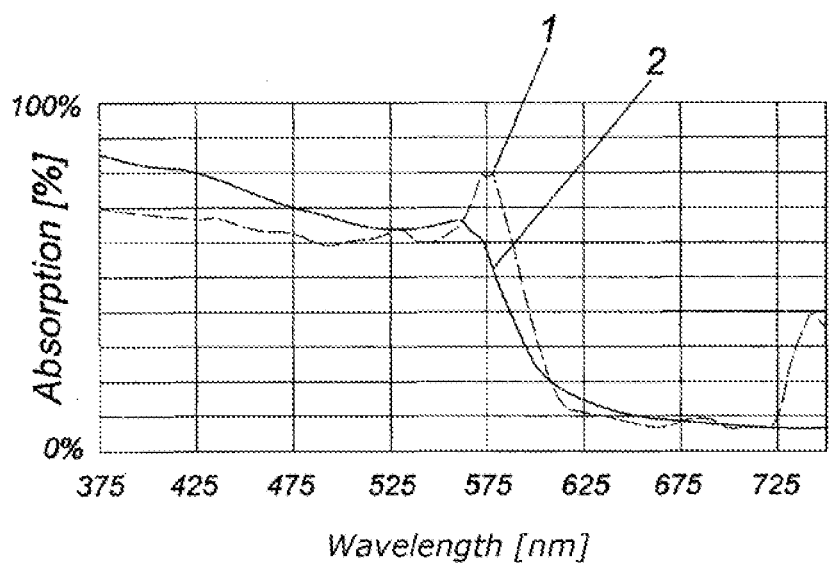

Further details and advantages of the present invention will be described more fully hereinafter by means of the specific description with reference to the drawings in which:

FIG. 1 shows a parallelogram corresponding to the standard color table in accordance with DIN 5033, the color point of a red-colored glass in an embodiment of the invention being in the interior of the parallelogram, and FIG. 2 shows a comparison of absorption spectra to illustrate the advantages of the red-colored glass according to the invention.

FIG. 1 shows a parallelogram having the corner points x=0.54, y=0.39 and x=0.61, y=0.39 and x=0.7, y=0.3 and x=0.62, y=0.3 corresponding to DIN 5033. The color point of the red-colored glass in an embodiment of the invention is in the interior of that parallelogram. Such a red is distinguished by high brilliance and high color saturation.

FIG. 2 shows two absorption spectra, wherein the broken-line curve 1 corresponds to a red-colored glass according to the invention while the solid-line curve 2 corresponds to a red-colored glass which has no neodymium oxide. It will be seen that, at a wavelength of about 575 nm, the red-colored glass with neodymium oxide absorbs markedly more radiation and as a result has a severely falling edge of the absorption curve 1 in the direction of higher wavelengths. That is necessary to produce a brilliant red color which occurs within the region between 625 and 725 nm. In other words: only the absorption of the wavelength range which is actually relevant for the red color is attenuated with a glass according to the invention whereby the red color is afforded with a high level of brilliance with at the same time high transmission integrated over the visible spectral range.

Production of such a high level of absorption at a wavelength of about 575 nm and an associated color brilliance is not possible without the addition of neodymium oxide. In that case the red-colored glass would have a markedly lesser transmission. The neodymium oxide provides that the absorption edge of the glass in the region of about 575 nm becomes steeper or a sharp transmission edge towards higher wavelengths can be produced. Due to the small proportion of copper the absorption in the region between 625 and 725 nm is very greatly attenuated to in part below 10%. In particular that applies to the red range of 680 nm thereby providing very high transmission in that region. That is also a reason why the transmission integrated over the entire visible spectral range is of an extremely high value for red-colored glasses. The red-colored glass of the invention thus corresponds in its optical qualities to the glasses which are colored red by the use of cadmium and which are to be avoided because of environmental damage.

The invention claimed is:

1. A red-colored glass comprising a basic glass, coloring additives, reducing agents, and stabilising agents,
    wherein the coloring additives have copper oxides and neodymium oxides,
    wherein the reducing agents have tin oxides,
    wherein the stabilising agents have antimony oxides, and
    wherein an amount of copper oxides in the red-colored glass is between 0.02 and 0.08% by weight.

2. The glass as set forth in claim 1, wherein the amount of copper oxides in the red-colored glass is between 0.02 and 0.06% by weight.

3. The glass as set forth in claim 1, wherein an amount of the coloring additives, the reducing agents and the stabilising agents in the red-colored glass are overall between 2 and 8% by weight.

4. The glass as set forth in claim 1, wherein the copper oxides are introduced into the glass as copper (I)-oxide.

5. The glass as set forth in claim 1, wherein the tin oxides are introduced into the glass as SnO.

6. The glass as set forth in claim 1, wherein an amount of the neodymium oxides in the red-colored glass is between 0.5 and 5% by weight,
    an amount of the antimony oxides is between 0.3 and 3.5% by weight, and
    an amount of the tin oxides is between 0.5 and 4% by weight.

7. The glass as set forth in claim 1, wherein an amount of the neodymium oxides in the red-colored glass is between 0.5 and 5% by weight or an amount of the antimony oxides is between 0.3 and 3.5% by weight or an amount of the tin oxides is between 0.5 and 4% by weight.

8. The glass as set forth in claim 1, wherein contained in the red-colored glass are further additives in the form of $AgCl_2$ an amount of at most 0.5% by weight,
    $Fe_2O_3$ in an amount of at most 0.5% by weight,
    $SnCl_2$ in a proportion an amount of at most 4% by weight, and
    $SnO_2$ in an amount of at most 4% by weight.

9. The glass as set forth in claim 1, wherein contained in the red-colored glass are further additives in the form of $AgCl_2$ in an amount of at most 0.5% by weight or $Fe_2O_3$ in an amount of at most 0.5% by weight or $SnCl_2$ in an amount of at most 4% by weight or $SnO_2$ in an amount of at most 4% by weight.

10. The glass as set forth in claim 1, wherein a color point in accordance with DIN 5033 of the glass is arranged within a parallelogram having the corner points x0.54, y=0.39 and x=0.61, y=0.39 and x=0.7, y=0.3 and x=0.62, y=0.3, wherein the x- and y-values relate to D65 standard light and a 2° observer.

11. The glass as set forth in claim 1, wherein a transmission of the glass, which is integrated over the visible spectral range of the light, at D65 standard light and a 2° observer, is at least 25%.

12. The glass as set forth in claim 1, wherein the basic glass includes the following components with an amount by mass:

| Oxide/substance | % by weight | |
|---|---|---|
| | From | To |
| $SiO_2$ | 50 | 75 |
| $K_2O$ | 0 | 12 |
| $Na_2O$ | 8 | 15 |
| $Li_2O$ | 0 | 5 |
| ZnO | 0 | 13 |
| CaO | 0 | 11 |
| MgO | 0 | 7 |
| BaO | 0 | 10 |
| $Al_2O_3$ | 0 | 4 |
| $ZrO_2$ | 0 | 2 |
| $B_2O_3$ | 0 | 4 |
| F | 0 | 3 |
| Cl | 0 | 2.5 |

13. A method of producing the red-colored glass set forth in claim 1, comprising the steps of:
    a) mixing a substance comprising a basic glass with coloring additives, reducing agents, and stabilising agents,
        wherein the coloring additives have copper oxides and neodymium oxides,
        wherein the reducing agents have tin oxides,
        wherein the stabilising agents have antimony oxides, and
        wherein amount of the copper oxides is between 0.02 and 0.08% by weight,
    b) melting the mixed substance from step (a),
    c) cooling down the melted substance from step (b), and
    d) tempering the cooled melted substance from step (c).

14. The method as set forth in claim 13, wherein the amount of the copper oxides is between 0.02 and 0.06% by weight.

15. The method as set forth in claim 13, wherein an amount of the neodymium oxides is between 0.5 and 5% by weight,
    an amount of the tin oxides is between 0.5 and 4% by weight, and
    an amount of the antimony oxides is between 0.3 and 3.5% by weight.

16. The method as set forth in claim 13, wherein an amount of the neodymium oxides is between 0.5 and 5% by weight or an amount of the tin oxides is between 0.5 and 4% by weight or an amount of the antimony oxides is between 0.3 and 3.5% by weight.

17. The method as set forth in claim 13, wherein a total amount of the coloring additives, the reducing agents and the stabilising agents is between 2 and 8% by weight.

18. The method as set forth in claim 13, wherein the copper oxides are introduced into the glass as copper (I)-oxide and the tin oxides are introduced into the glass as SnO.

19. The method as set forth in claim 13, wherein the copper oxides are introduced into the glass as copper (I)-oxide or the tin oxides are introduced into the glass as SnO.

20. The method as set forth in claim 13, wherein further additives are mixed with the basic glass, the coloring additives, the reducing agents and the stabilising agents,
wherein the further additives include
$AgCl_2$ in an amount of at most 0.5% by weight,
$Fe_2O_3$ in an amount of at most 0.5% by weight,
$SnCl_2$ in an amount of at most 4% by weight, and
$SnO_2$ in an amount of at most 4% by weight.

21. The method as set forth in claim 13, wherein further additives are mixed with the basic glass, the coloring additives, the reducing agents, and the stabilising agents,
wherein the further additives include $AgCl_2$ in an amount of at most 0.5% by weight or $Fe_2O_3$ in an amount of at most 0.5% by weight or $SnCl_2$ in an amount of at most 4% by weight or $SnO_2$ in an amount of at most 4% by weight.

22. The method as set forth in claim 13, wherein melting of the mixed substance is carried out at a temperature of between 1350 and 1500° C. under reduced conditions.

23. The method as set forth in claim 13, wherein the tempering is carried out at a temperature between 400 and 550° C. for a period between 1 and 40 hours.

24. The method as set forth in claim 13, wherein the tempering is carried out at a temperature between 440 and 520° C. for a period between 1 and 40 hours.

* * * * *